United States Patent [19]

Pitcher

[11] Patent Number: 5,609,835
[45] Date of Patent: Mar. 11, 1997

[54] MULTI-PURPOSE APPARATUS

[75] Inventor: Maurice Pitcher, Stoke-On-Trent, United Kingdom

[73] Assignee: Powder Systems Limited, Liverpool, England

[21] Appl. No.: 374,675

[22] PCT Filed: Jul. 21, 1993

[86] PCT No.: PCT/GB93/01535

§ 371 Date: Jan. 23, 1995

§ 102(e) Date: Jan. 23, 1995

[87] PCT Pub. No.: WO94/02241

PCT Pub. Date: Feb. 3, 1994

[30] Foreign Application Priority Data

Jul. 22, 1992 [GB] United Kingdom ............... 9215585

[51] Int. Cl.$^6$ .................. B01F 7/00; B28C 5/00
[52] U.S. Cl. ................. 422/225; 422/135; 422/236; 366/14; 366/15; 366/293; 435/294.1
[58] Field of Search .................. 422/129, 135, 422/209, 210, 224, 225, 236; 366/14, 15, 279, 290, 136, 137, 293; 210/770, 189, 195.1, 205, 206, 252, 260, 261, 262; 435/290.3, 294.1, 295.1, 819

[56] References Cited

U.S. PATENT DOCUMENTS

| | | | |
|---|---|---|---|
| 2,089,214 | 8/1937 | Lomax ................. | 210/262 |
| 3,004,013 | 10/1961 | Kirchner, Jr. et al. ........ | 422/225 X |
| 3,362,794 | 1/1968 | Bergman ................. | 422/236 |
| 3,607,101 | 9/1971 | Cochran ................. | 422/225 |
| 3,739,711 | 6/1973 | Nieblach ................. | 366/290 X |
| 3,752,653 | 8/1973 | Weber ................. | 422/135 X |
| 4,081,381 | 3/1978 | Rosenmund et al. ........ | 210/408 |
| 4,260,739 | 4/1981 | Geyer, Jr. et al. ........ | 422/225 X |
| 4,286,065 | 8/1981 | Kaluniants et al. ........ | 435/294.1 |
| 4,592,835 | 6/1986 | Grieder et al. ........ | 210/107 |
| 4,610,547 | 9/1986 | Bennett et al. ........ | 366/270 |
| 4,933,115 | 6/1990 | Krippl et al. ........ | 261/18.1 |
| 5,078,506 | 1/1992 | Tischer ................. | 366/314 |
| 5,372,790 | 12/1994 | Shirtum et al. ........ | 422/135 |

FOREIGN PATENT DOCUMENTS

| | | |
|---|---|---|
| 0123316 | 10/1984 | European Pat. Off. . |
| 3186345 | 8/1991 | Japan . |
| 8200258 | 2/1982 | WIPO . |

OTHER PUBLICATIONS

*Development Trends in Pressure Filtration*, publication of Rosenmund AG., pp. 61–68, Circa 1986.
*NUTREX Reactor–Filter–Dryer*, one page brochure by Rosenmund AG., pp. 67, circa 1986.

Primary Examiner—Christopher Kim
Attorney, Agent, or Firm—Knobbe, Martens, Olson & Bear

[57] ABSTRACT

An apparatus enabling reaction and post-reaction processing in a single assembly including a reaction chamber and a filtration and/or drying chamber adjacent to one another, the chambers being selectively isolated or in communication. A shaft common to both chambers is capable of rotation and axial movement. An agitator arm is fitted to the shaft in the reaction chamber while a smoothing and pressing arm is fitted to the shaft in the filtration and/or drying chamber. The chambers may be formed in a single cylindrical vessel with an intermediate cross wall providing isolation between the chambers. A U-shaped conduit extends between the chambers and by-passes the cross wall to enable communication between the chambers. The conduit may incorporate a valve/pump to facilitate transfer between the chambers. The shaft is journalled through the cross wall and has a bellows apparatus to protect the bearing from the respective chambers.

27 Claims, 2 Drawing Sheets

MULTI-PURPOSE APPARATUS

FIELD OF THE INVENTION

The present invention relates to multi-purpose apparatus and more particularly, though not exclusively to a vessel capable of completing the operations which would normally necessitate the use of three separate units, for example a reaction vessel, an isolator filter and a dryer.

BACKGROUND OF THE INVENTION

Traditionally, many chemical processes, particularly the production of fine chemicals and pharmaceuticals require a three stage operation which includes the steps of:

1. reacting the starting materials and crystalising the resulting product,
2. filtering the product, and
3. drying it.

This process requires at least two vessels, a reaction vessel and a filtration drying unit. Both the reaction vessel and the filtration drying unit utilize drive shafts to operate agitators and smoothing arms respectively. The drives are both expensive and bulky as are the vessels. Furthermore, the reaction vessel is ideally set up above and to the side of the filtration unit so that the reactant can be easily transferred from the reaction vessel to the filtration drying unit. This arrangement takes up space (both height and width) which could be utilized in other ways.

Also from the processing stand point the transfer of material at the end of each stage gives rise to a risk of contamination and reduced yields.

An improved vessel has been supplied by Rosenmund AG under the Trade Mark NUTREX. This multi-purpose apparatus offers the capability of carrying out the operations of reaction, filtration and drying in immediate sequence within a single vessel.

One end of the vessel acts as a reaction/crystallization unit whilst the other end acts as a filtration/washing/reslurry unit, it being necessary to rotate the single vessel through 180° from a position in which reaction takes place to a position in which filtration takes place. The apparatus can then be rotated through a further 50° (230° in total) to a position in which drying and discharge can take place.

Whilst such an arrangement saves space, there being a single unit compared to the at least two separate units of conventional apparatus the arrangement suffers a number of draw backs. These include:

1. a requirement to disconnect and reconnect the service pipes for the different operations as a result of rotating the apparatus,
2. the provision of two drive systems, a large one for rotating the apparatus and another for controlling a double-shafted agitator system comprising a stationary agitator for reaction and an axially operable smoothing arm for the filtration process, and
3. a space requirement for rotation of the apparatus and the provision of extra safety features as a result of the apparatus's rotation It is an object of the invention to provide an improved multi-purpose apparatus without the problems associated with the aforementioned prior art.

SUMMARY OF THE INVENTION

According to the present invention there is provided a multi-purpose apparatus comprising first and second units, the first unit serving as a reaction vessel and the second unit serving as a filtration and/or drying unit, means enabling isolation and communication therebetween, the apparatus being characterised in that an elongate drive shaft passes through the reaction vessel into the filtration and/or drying unit or vice-versa, said drive shaft being capable of both longitudinal and rotational movement within the respective first and second units.

By providing an elongate drive shaft through the first unit into the second unit the objects of the invention are met.

Preferably the elongate drive shaft is a single drive shaft, although it may comprise two drive shafts coupled at respective ends to form an elongate drive shaft.

Preferably the first and second units will be the first and second chambers of a single vessel which is sub-divided by the provision of a crosswall passing therebetween. Alternatively, the two units may be separate vessels which are positioned one above the other such that a single elongate drive shaft can be mounted so as to operate within both units.

In one embodiment the multi-purpose apparatus comprises a generally cylindrical vessel having a top portion and a base portion which are connected by a side wall, which vessel is sub-divided by a crosswall into an upper reaction chamber and a lower filtration chamber the crosswall extending inwards of the side wall substantially perpendicular to the longitudinal axis of an elongate drive shaft which passes through the top portion into the reaction chamber and through the crosswall into the filtration chamber.

In another embodiment the cross-wall may be inclined at an angle other than substantially 90° to the side wall to aid communication between the two chambers. In a further embodiment it may be concave or convex, Preferably, though not essentially the drive shaft passes through the center of the top portion of the vessel into the reaction chamber and through the centre of the crosswall into the filtration chamber situated therebelow, The drive shaft is preferably mounted above the multi-purpose vessel in a manner allowing both longitudinal and rotational movement of the drive shaft to occur. To this end the drive shaft is preferably retained about the cross member by a bellows and rotary bearings which allow for both longitudinal and rotational movement. The bellows also serve to keep the reaction mixture and product formed therefrom away from the bearings.

The single drive can be used to control both agitation during the reaction stage and smoothing and pressing during filtration. To this end the drive shaft has an agitator arm fitted thereto in the reaction chamber and a smoothing and pressing arm fitted thereto at the base of the drive shaft in the filtration chamber.

The vessel is provided with communicating means between the reaction and filtration chambers. In one embodiment the communication means takes the form of a U-tube which exits from the side and bottom of the reaction chamber and re-enteres the filtration chamber through the side wall about mid-way down the filtration chamber.

This will readily allow the fast transfer of material from one chamber to the other by vacuum, pressure or a combination thereof.

The apparatus also comprises an access port at the top of the reaction vessel and an exit port at the bottom of the fitration chamber as well as valve means for removing the product.

Preferably one or both of the top of the reaction chamber or the base of the filtration unit are releasably attached to the side walls to enable easy access to the internal workings of the vessel.

Preferably the internal face of the side wall of the vessel is provided with spray systems there around so that product can be washed from the reaction vessel into the filtration unit thereby increasing yields and reducing the risk of cross contamination.

BRIEF DESCRIPTION OF THE DRAWINGS

The invention will now be described, by way of example only, with reference to the drawings.

DESCRIPTION OF THE PREFERRED EMBODIMENTS

Figure 1:
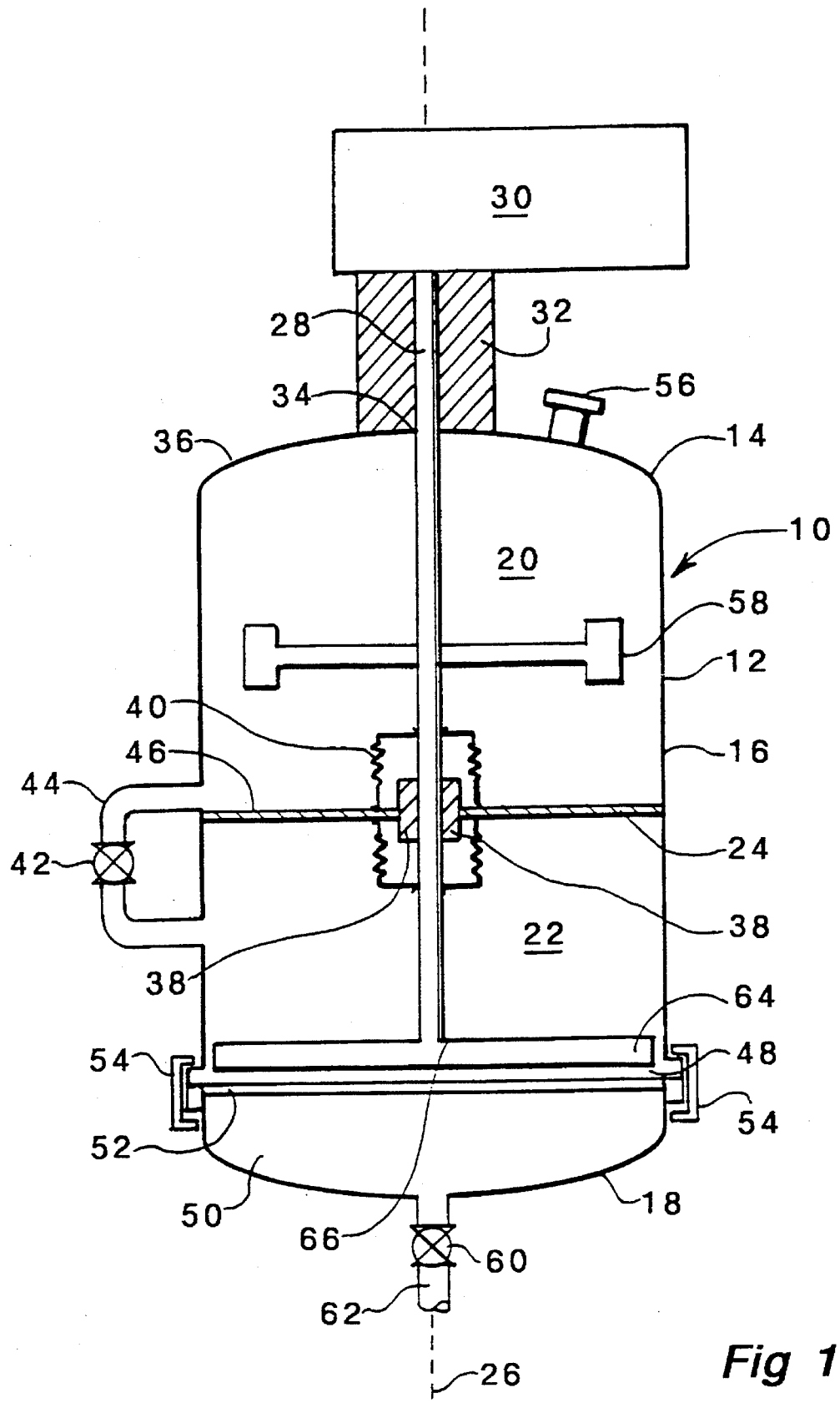
FIG. 1 is a simplified cross-sectional view of a multi-purpose apparatus of the present invention.
Figure 2:
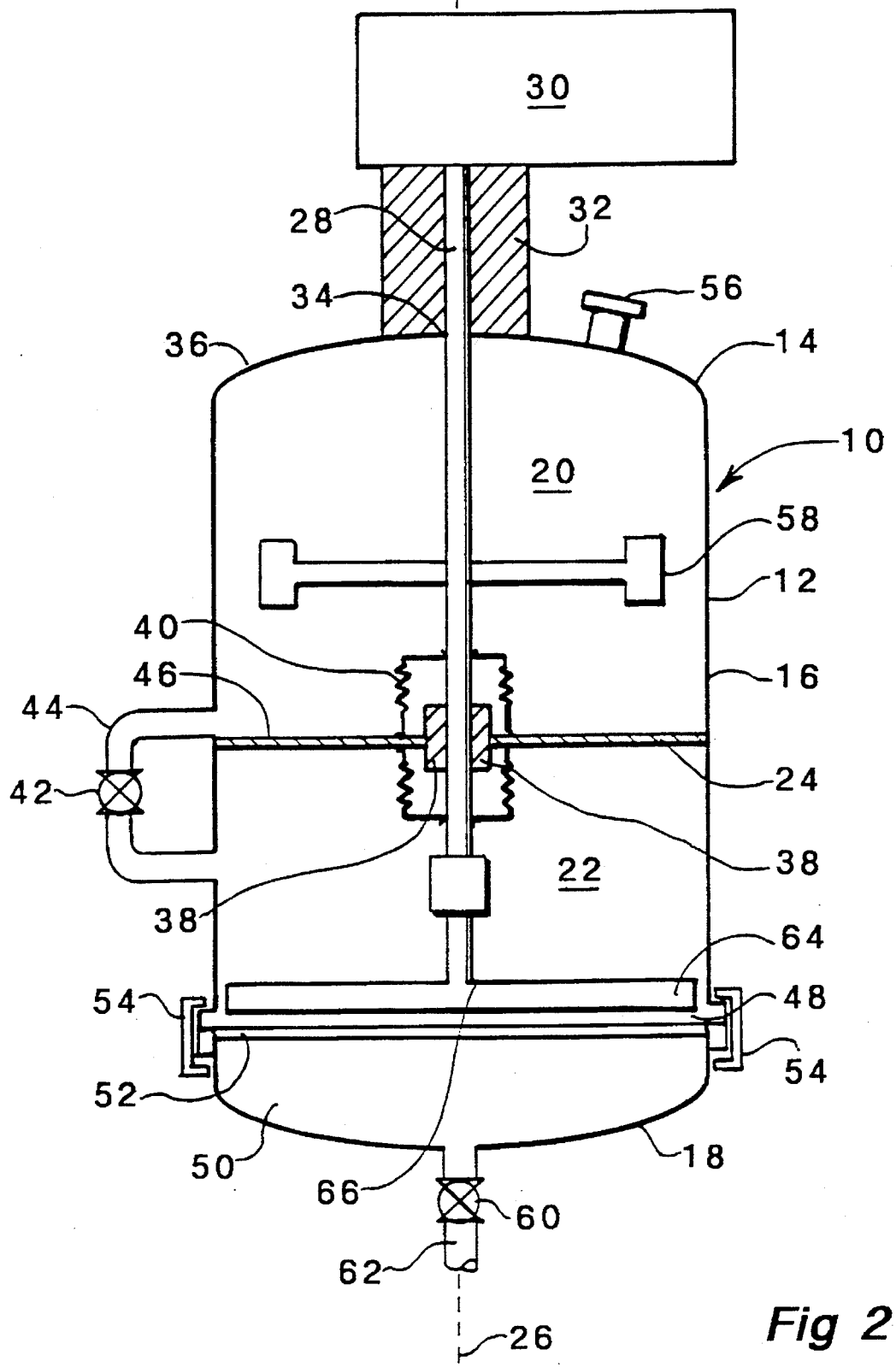
FIG. 2 is a simplified cross-sectional view of a multi-purpose apparatus of the present invention having an elongate drive shaft formed by two drive shafts coupled at respective ends.

The multi-purpose apparatus 10 comprises a generally cylindrical vessel 12 with a top portion 14 and a bottom portion 18 which are connected to one another by a side wall 16. The vessel 12 is divided into an upper reaction chamber 20 and a lower filtration unit 22 by a crosswall 24 which is situated approximately mid way down the vessel. The crosswall 24 lies substantially perpendicular to the plane of side wall 16 and the longitudinal axis 26 of elongate drive shaft 28. The drive shaft 28 is driven by a drive 30 with a lifting/lowering facility which is situated above the vessel 12. From the drive 30 the drive shaft 28 passes through a spacer/support 32 and sealingly through the centre portion 34 of the lid portion 36 of the reaction chamber 20. It then passes from the reaction chamber 20 into the filtration unit 22 through cross wall 24 where it is sealingly engaged therein by bearings 38. These bearings 38 provide support for the drive shaft and allow for both rotational and longitudinal movement thereof. The bearings 38 are housed in a bellows 40 which allow for movement of the shaft in the direction of the shafts longitudinal axis. A valve/pump 42 is provided between the reaction chamber 20 and filtration unit 22 to allow the transfer of the reacted product to the filtration unit 22. In the embodiment illustrated this takes the form of a U-tube 44 which extend from the lower surface 46 of the crosswall 24 through side wall 16 and downwards where it re-enters the filtration unit 22 approximately mid-way down. Other valve systems such as the one passing through the crosswall 24 could, however, be used.

At the bottom 48 of the filtration unit there is provided a removeable base 50 with a filter plate 52 fitted thereto. The base 50 and filter plate 52 are releasably attached to the wall 16 of unit 22 by fastening means 54.

In use reactants are loaded into the reaction chamber 20 through inlet port 56 provided in lid portion 36 of the reaction chamber 20. The reactants are then processed, the drive 30 controlling the drive shaft 28 which in turn operates an agitator arm 58 which is attached thereto.

When the reaction is complete the reaction mix can be transferred from the reaction chamber 20 into the filtration unit 22 via U-tube 44 and valve/pump 42. The product can be washed through by a spray system which is not shown for simplicity.

Once transferred to the filtration unit, filtration can be completed by filtering the slurry through filter plate 52, the liquid being drawn off, under pressure or vacuum if necessary, through valve 60 outlet 62. The resulting cake can be washed using a spray system (again not shown for simplicity) and re-suspended by driving agitator arm 64 provided at the end 66 of drive shaft 28. The wash liquid is then filtered off.

The product can then be dried by the provision of one or more from underplate heating, side wall or agitator heating, and the application of vacuum heating and removed through a valve system. Again this is not shown in the drawing for the purposes of simplicity. The base 50 and filter plate 52 are releasably attached to wall 16 by clamps 54 to allow access to the inside of the unit 22.

What is claimed is:

1. A multi-purpose apparatus, comprising:

first and second units, wherein the first unit is a reaction vessel and the second unit is a filtration unit and/or a drying unit;

a mechanism enabling isolation and communication between the first and second units;

an elongate drive shaft which extends within both the first and second units, said drive shaft being capable of both longitudinal and rotational movement within the respective first and second units;

an agitator arm fitted to the drive shaft in the first unit; and a smoothing and pressing arm fitted to the drive shaft in the second unit.

2. An apparatus as claimed in claim 1 in which the elongate drive shaft is a one piece shaft.

3. An apparatus as claimed in claim 1, in which the elongate drive shaft comprises two drive shafts coupled at respective ends to form an elongate drive shaft.

4. An apparatus as claimed in claim 1, wherein the first and second units are the first and second chambers of a single vessel which is sub-divided by a crosswall.

5. An apparatus as claimed in claim 1, wherein the two units are separate vessels positioned one above the other, the elongate drive shaft being mounted so as to operate within both vessels.

6. An apparatus as claimed in claim 4 in which the single vessel is a generally cylindrical vessel having a top portion and a base portion which are connected by a side wall, which vessel is sub-divided by the crosswall into an upper reaction chamber and a lower filtration chamber, the crosswall extending inwards of the side wall substantially perpendicular to a longitudinal axis of the drive shaft which drive shaft passes through the top portion into the reaction chamber and through the crosswall into the filtration chamber.

7. An apparatus as claimed in claim 6 in which the drive shaft passes substantially through the center of the top portion of the first unit, into the reaction chamber and substantially through the center of the crosswall into the second unit situated therebelow.

8. An apparatus as claimed in claim 6 wherein the drive shaft is retained about the crosswall by a bellows and rotary bearings.

9. An apparatus as claimed in claim 1, further comprising an access port at the top of the first unit and an exit port and valve means at the bottom of the second unit.

10. An apparatus as claimed in claim 1, wherein the second unit has a removable bottom.

11. An apparatus as claimed in claim 1, wherein at least one of the first and second units is provided with a spray system.

12. A multi-purpose chemical processing apparatus, comprising:

a chamber for conducting chemical reactions;

a post-reaction processing chamber adjacent the reaction chamber;

a member isolating said reaction chamber from said post-reaction processing chamber;

a device enabling selective communication between the reaction chamber and the post-reaction processing chamber;

an elongate drive shaft extending within both the reaction chamber and the post-reaction processing chamber, the drive shaft being capable of both longitudinal and rotational movement within the reaction chamber and post-reaction processing chamber;

an agitator arm fixed to the drive shaft and located in the reaction chamber; and a smoothing and pressing arm fixed to the drive shaft in the post-reaction processing chamber.

13. The apparatus of claim 12, wherein the elongate drive shaft is a one-piece shaft.

14. The apparatus of claim 12, in which the elongate drive shaft comprises two drive shafts coupled at respective ends.

15. The apparatus of claim 12, wherein the reaction chamber and the post-reaction processing chamber form a single vessel having a peripheral outer wall common to both chambers, and said isolation member is a cross wall extending across the outer wall.

16. The apparatus of claim 15, wherein the reaction chamber and the post-reaction processing chamber are positioned one above the other and the elongate drive shaft is mounted so as to extend vertically within both chambers.

17. The apparatus as in claim 15, wherein the single vessel is generally cylindrical, having a top portion and a base portion connected by the outer wall which is tubular, the single vessel is subdivided into the reaction chamber in an upper portion and the post-reaction processing chamber in a lower portion by the cross wall, the drive shaft extends generally vertically through the reaction chamber and post-reaction processing chamber and the cross wall extends substantially perpendicularly to the drive shaft.

18. The apparatus as in claim 17, wherein the drive shaft extends centrally through the top portion of the reaction chamber and centrally through the cross wall into the post-reaction processing chamber.

19. The apparatus of claim 15, wherein the drive shaft is supported by bearings in the cross wall which allow longitudinal movement of the drive shaft and wherein a bellows apparatus is provided on both sides of the cross wall to allow for the longitudinal movement and seal the bearings from both the reaction and post-reaction processing chambers.

20. The apparatus in claim 12, wherein said post-reaction processing chamber is a filtration unit.

21. The apparatus in claim 20, wherein the filtration unit has a removable bottom.

22. The apparatus in claim 20, wherein the filtration unit is provided with a spray system.

23. The apparatus in claim 12, wherein the post-reaction processing chamber is a drying unit.

24. The apparatus in claim 12, wherein said communication device is a conduit extending between the reaction chamber and the post-reaction processing chamber, the conduit having a valve therein for selectively allowing communicating between the reaction chamber and the post-reaction processing chamber.

25. The apparatus in claim 12, wherein the communication device comprises a valve/pump between the reaction chamber and the post-reaction processing chamber.

26. The apparatus in claim 12, further including a valve provided at the bottom of the post-reaction processing chamber for draining the contents within.

27. The apparatus in claim 12, further including an access port at the top of the reaction chamber for introducing reactants within.

* * * * *